United States Patent
Baldwin et al.

(10) Patent No.: US 9,831,650 B1
(45) Date of Patent: *Nov. 28, 2017

(54) SEALED WALL PLATE

(71) Applicants: Jeffrey Baldwin, Anthem, AZ (US); Ryan Liebengood, Gilbert, AZ (US)

(72) Inventors: Jeffrey Baldwin, Anthem, AZ (US); Ryan Liebengood, Gilbert, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/588,696

(22) Filed: May 8, 2017

Related U.S. Application Data

(63) Continuation of application No. 15/363,118, filed on Nov. 29, 2016, now Pat. No. 9,666,975.

(51) Int. Cl.
*H02G 3/08* (2006.01)
*H02G 3/12* (2006.01)
*H01R 13/447* (2006.01)
*H01R 13/52* (2006.01)

(52) U.S. Cl.
CPC ........... *H02G 3/088* (2013.01); *H01R 13/447* (2013.01); *H01R 13/5202* (2013.01); *H02G 3/081* (2013.01); *H02G 3/12* (2013.01)

(58) Field of Classification Search
CPC .......... H02G 3/088; H02G 3/081; H02G 3/12; H01R 13/447; H01R 13/5202

USPC ........................................................... 174/66
See application file for complete search history.

(56) References Cited

U.S. PATENT DOCUMENTS

| | | | | |
|---|---|---|---|---|
| 3,028,467 A | * | 4/1962 | Hubbell | H01H 23/06 174/66 |
| 4,293,173 A | | 10/1981 | Tricca | |
| 4,640,564 A | * | 2/1987 | Hill | H01R 13/447 439/137 |
| 4,798,916 A | | 1/1989 | Engel | |
| 5,811,729 A | * | 9/1998 | Rintz | H01H 9/18 174/66 |
| 5,837,937 A | | 11/1998 | Reese | |
| 6,221,834 B1 | | 4/2001 | Yamamoto | |
| 7,554,033 B1 | * | 6/2009 | Bhosale | H01H 9/04 174/53 |
| 8,222,522 B1 | | 7/2012 | Easthouse | |
| 9,236,722 B1 | | 1/2016 | Baldwin | |

* cited by examiner

*Primary Examiner* — Dhirubhai R Patel
(74) *Attorney, Agent, or Firm* — Ryan Liebengood

(57) ABSTRACT

A wall plate including a plate having a front surface and a rear surface, a rear perimeter wall extending away from the rear surface, a gasket having a rear surface positioned adjacent the rear perimeter wall, and wherein the gasket rear surface is flexible and folds upon contact with a mounting surface.

12 Claims, 19 Drawing Sheets

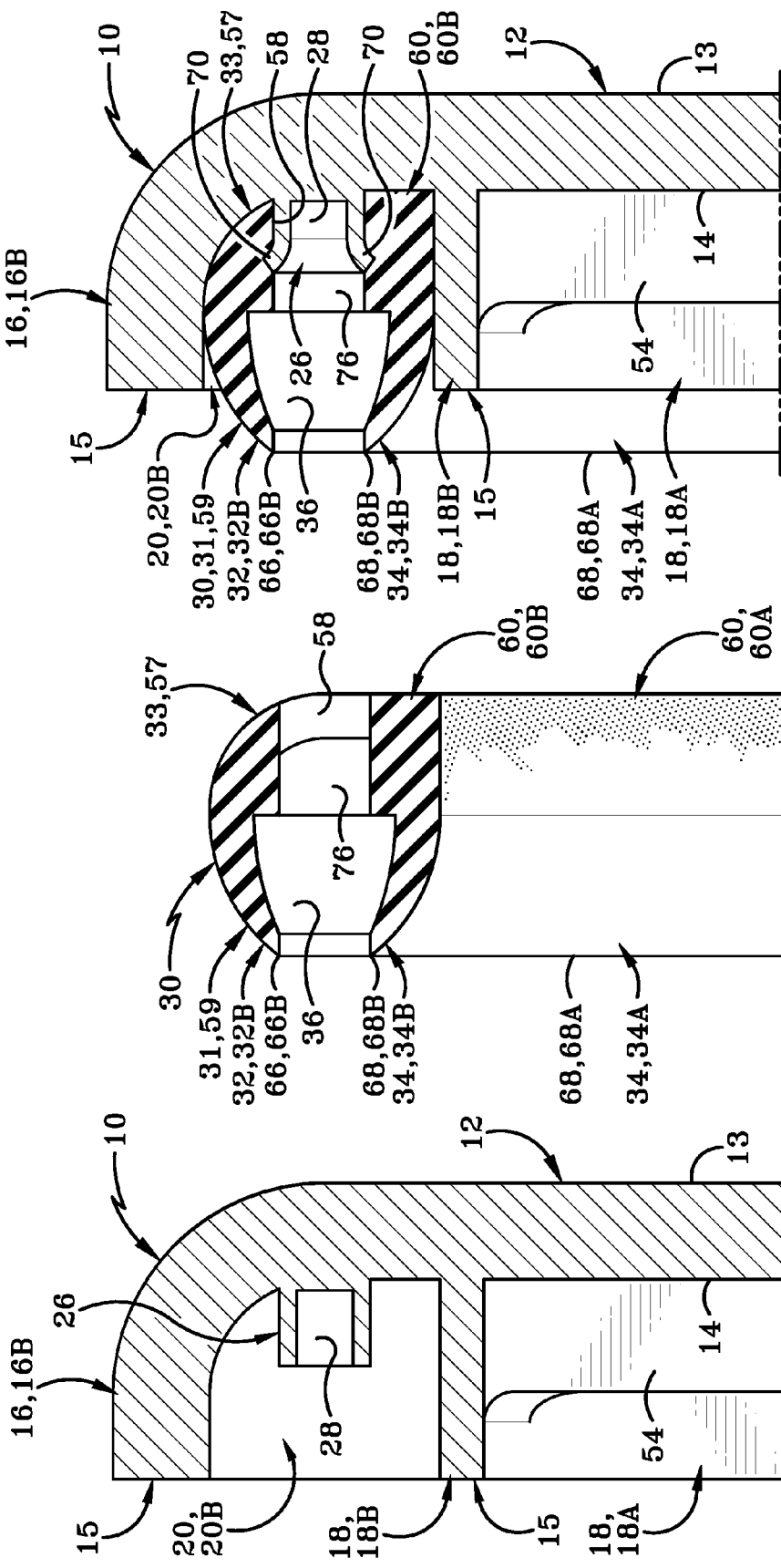

SEALED WALL PLATE

CROSS-REFERENCE TO RELATED APPLICATIONS

This application claims priority to and is a continuation of currently pending U.S. patent application Ser. No. 15/363,118, filed on Nov. 29, 2016 and titled SEALED WALL PLATE to Baldwin et al., now U.S. Pat. No. 9,666,975, the disclosure of which is hereby incorporated herein by reference.

BACKGROUND

1. Technical Field

Aspects of the present disclosure relate generally to wall plates and wall plates which seal the open area behind the wall plate.

2. Background Art

Wall plates are well known and are used to fill in the space between an electrical box and an electrical device. Specifically, the wall plates are known to provide a more aesthetically pleasing appearance while also preventing access to the electrical device. By preventing access to the electrical device, the user is safer because electrical wiring is not readily accessible.

SUMMARY

Aspects of this disclosure relate to a sealed wall plate. In one aspect, A wall plate including a plate having a front surface and a rear surface, a rear perimeter wall extending away from the rear surface, a gasket having a rear surface positioned adjacent the rear perimeter wall, and wherein the gasket rear surface is flexible and folds upon contact with a mounting surface.

In an implementation, the gasket rear surface may be generally U-shaped. The gasket rear surface may include two prongs which contact each other when the gasket rear surface contacts the mounting surface. The wall plate may further include at least one mounting aperture extending form the front surface to the rear surface. The plate rear surface may further include a channel at least partially defined by the rear perimeter wall. The gasket is may be positioned within the channel and extends rearward out of the channel.

The plate rear surface may further include a plurality of mounting protrusions extending away from the rear surface. The gasket may further include a plurality of mounting apertures arranged to receive the plurality of mounting protrusions. The gasket may be composed of rubber. The gasket may fold inward upon contact with the mounting surface. The gasket may fold outward upon contact with the mounting surface. The gasket may be thicker on two sides. The gasket may be thicker along two long sides. The gasket may further include an inner straight wall oriented opposite a curved outer wall.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired.

The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments of the present invention will hereinafter be described in conjunction with the appended drawings, where like designations denote like elements, and:

FIG. 10 is a sectional view taken generally about line 10-10 in FIG. 5.

FIG. 11 is a sectional view taken generally about line 11-11 in FIG. 8.

FIG. 12 is a sectional view taken generally about line 12-12 in FIG. 9.

DETAILED DESCRIPTION

Figure 1:
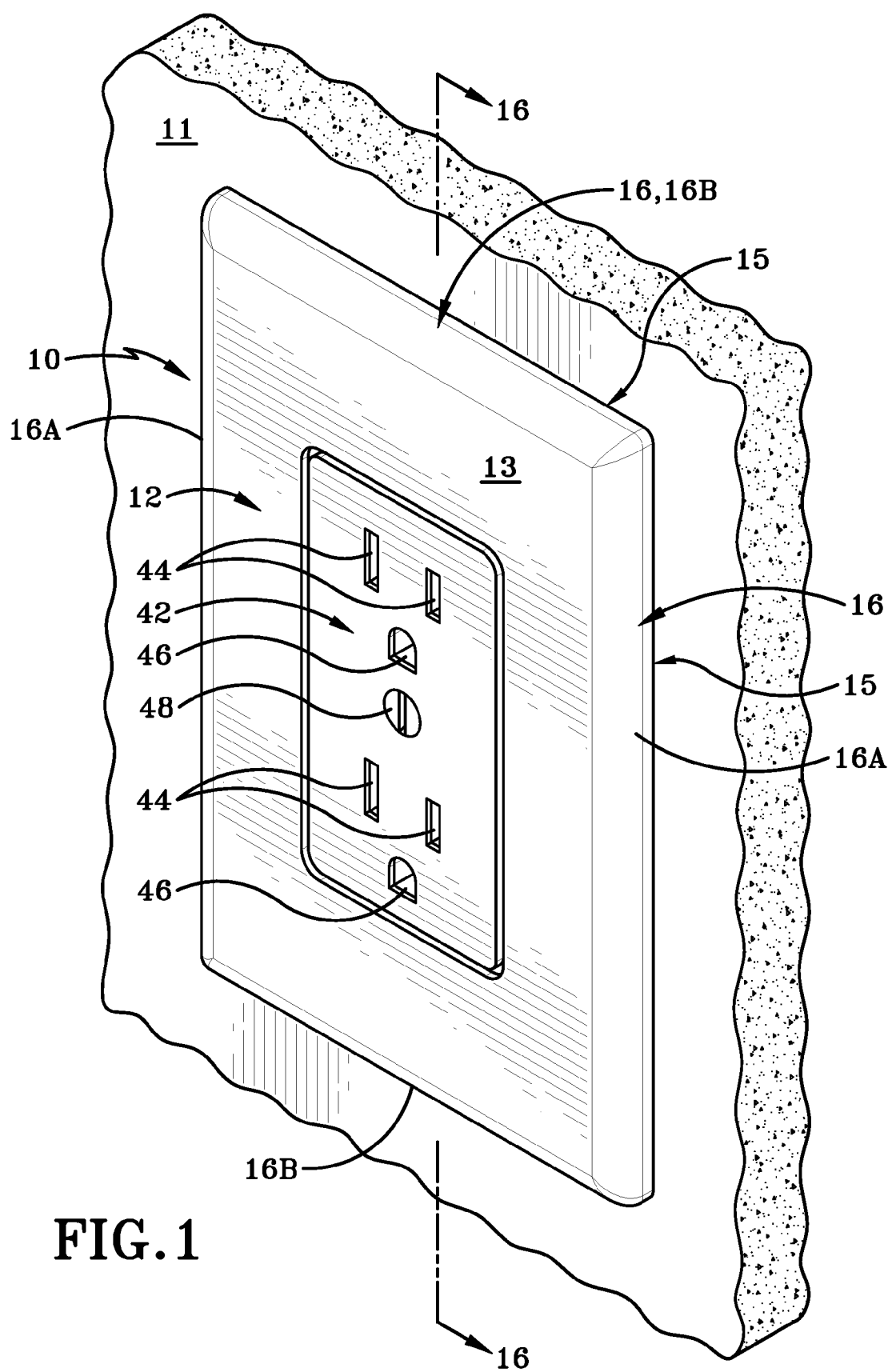
FIG. 1 is a front perspective view of a sealed wall plate.
Figure 2:
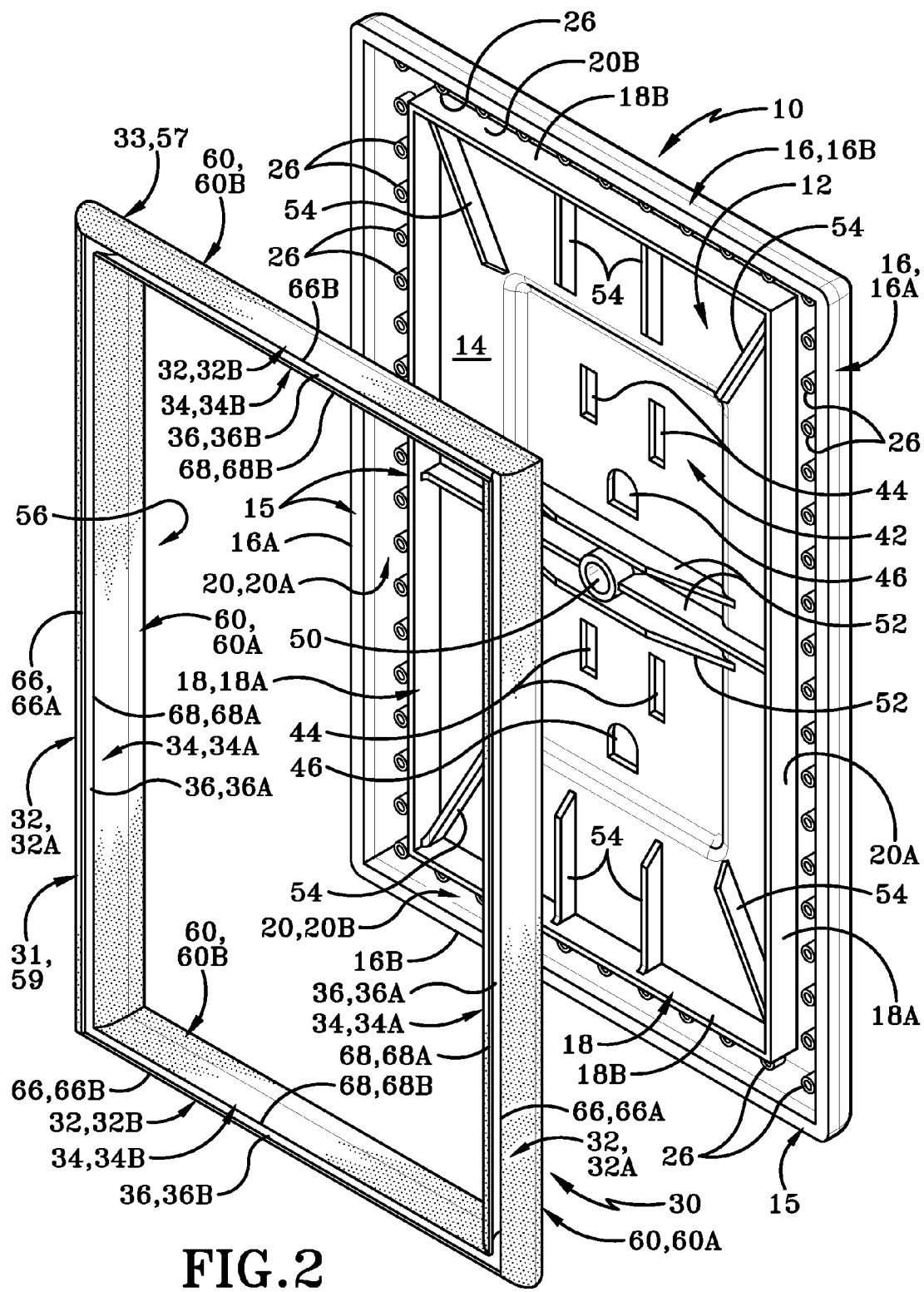
FIG. 2 is an exploded rear perspective view of the sealed wall plate.
Figure 3:
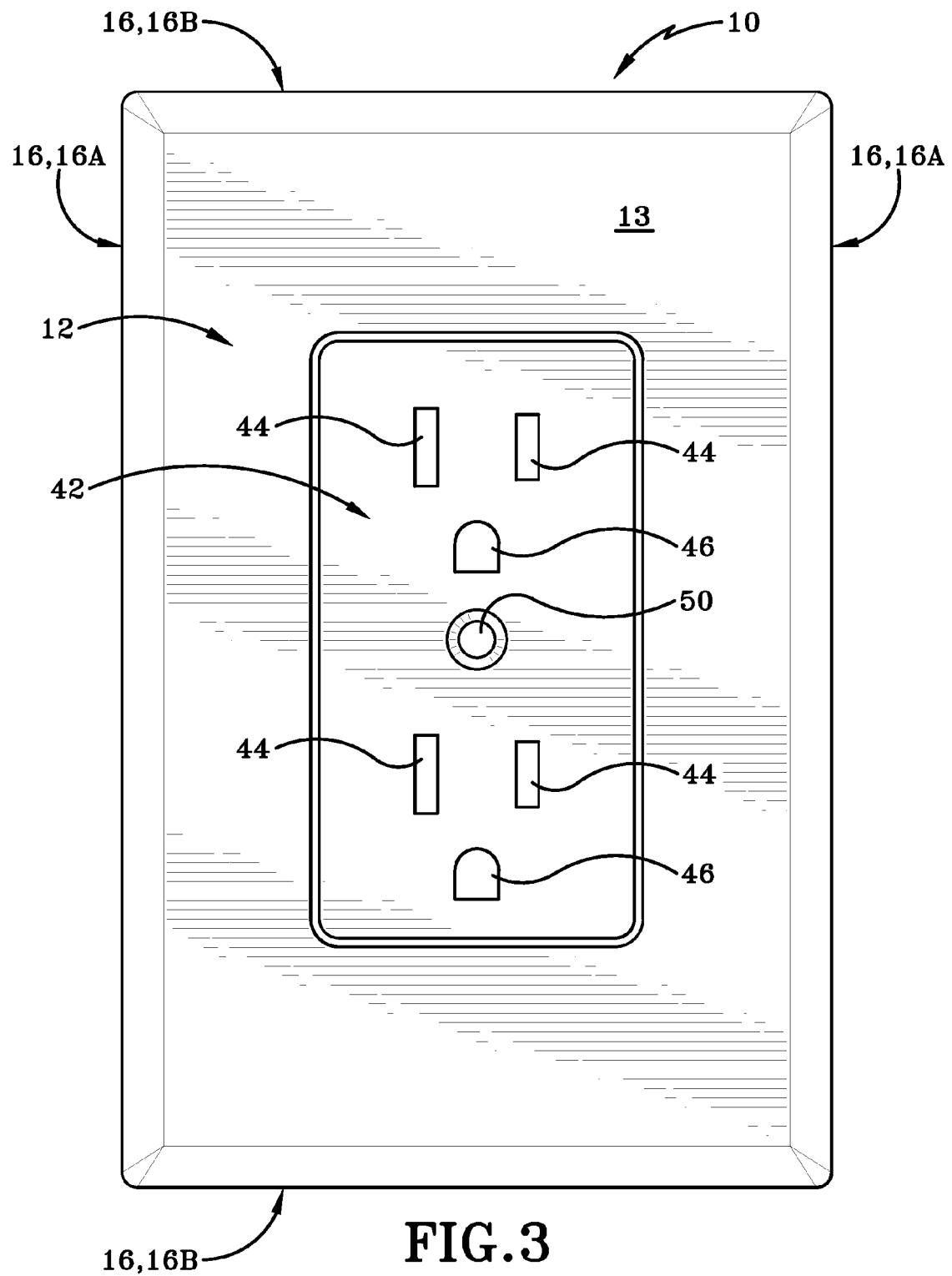
FIG. 3 is a front view of the sealed wall plate.
Figure 4:
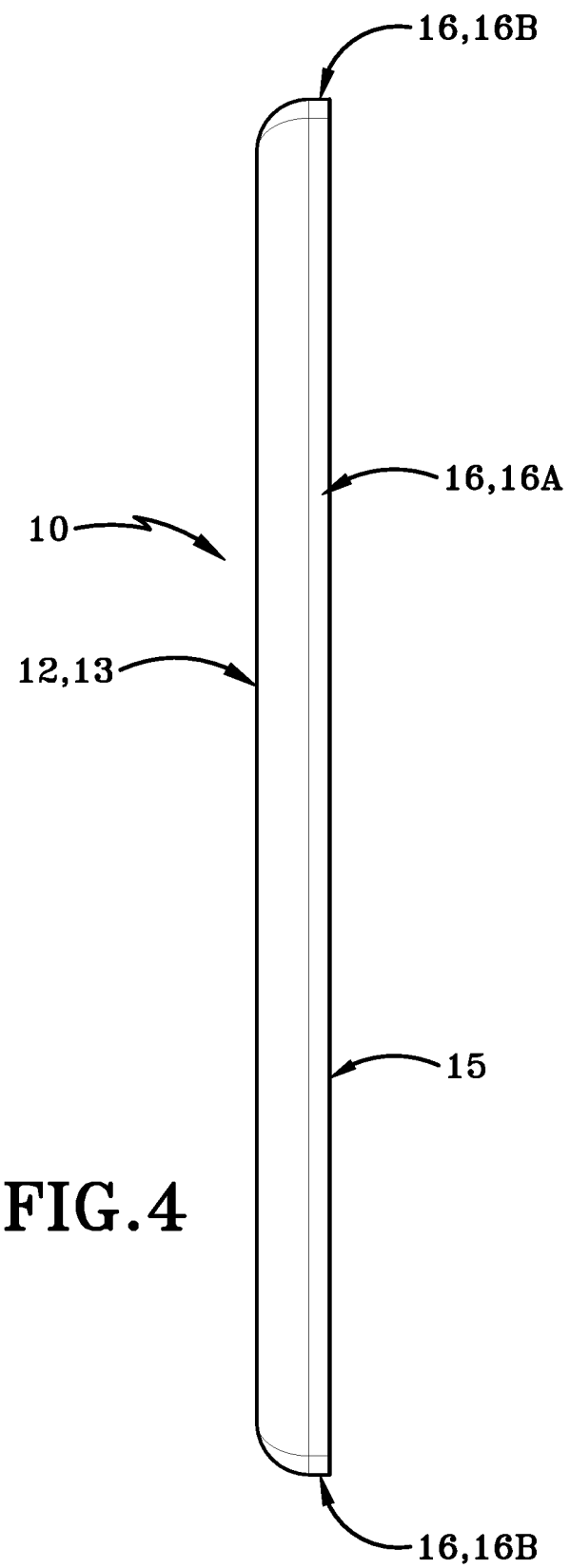
FIG. 4 is a side view of the sealed wall plate.
Figure 5:
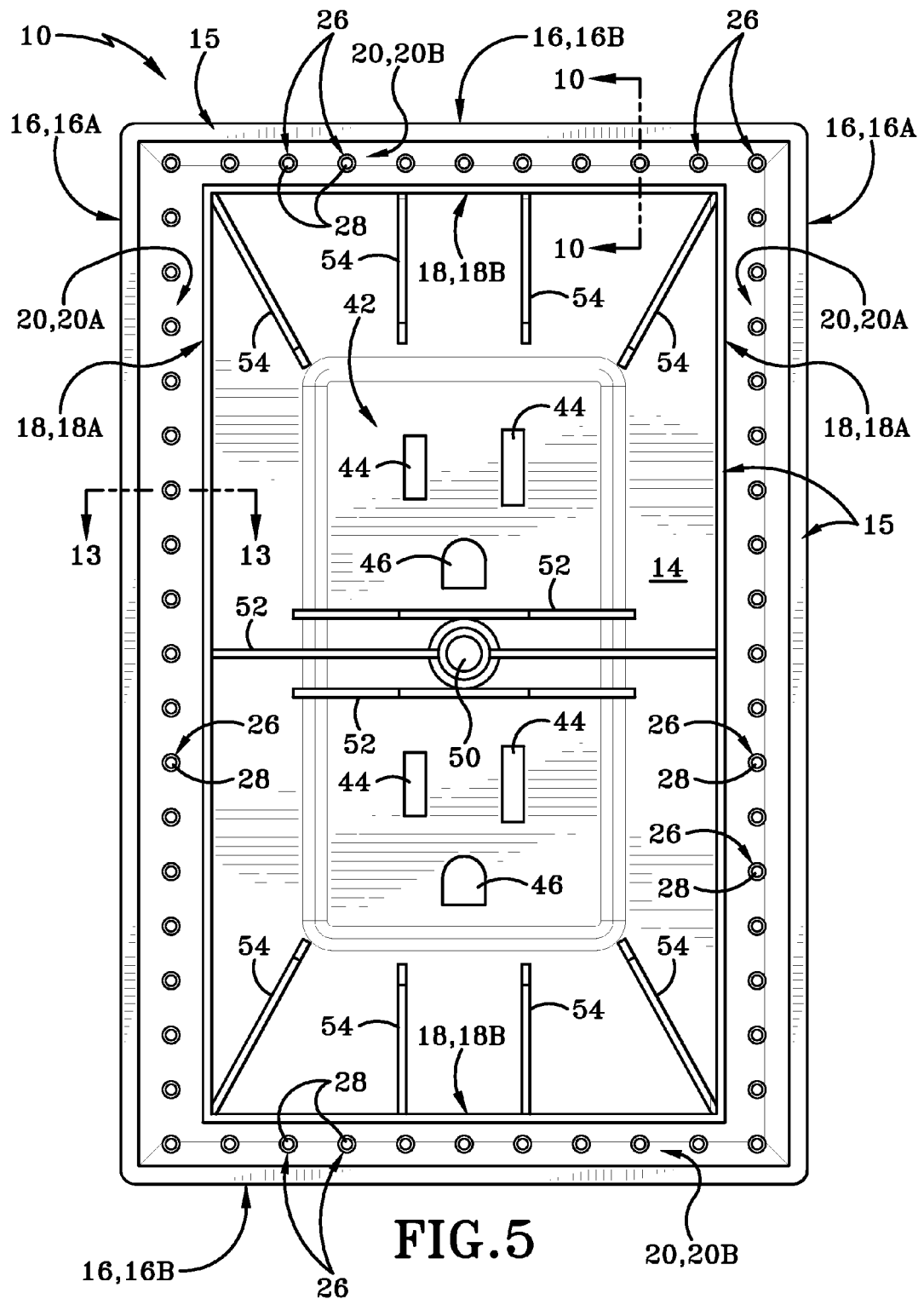
FIG. 5 is a rear view of the sealed wall plate with gasket removed.
Figure 6:
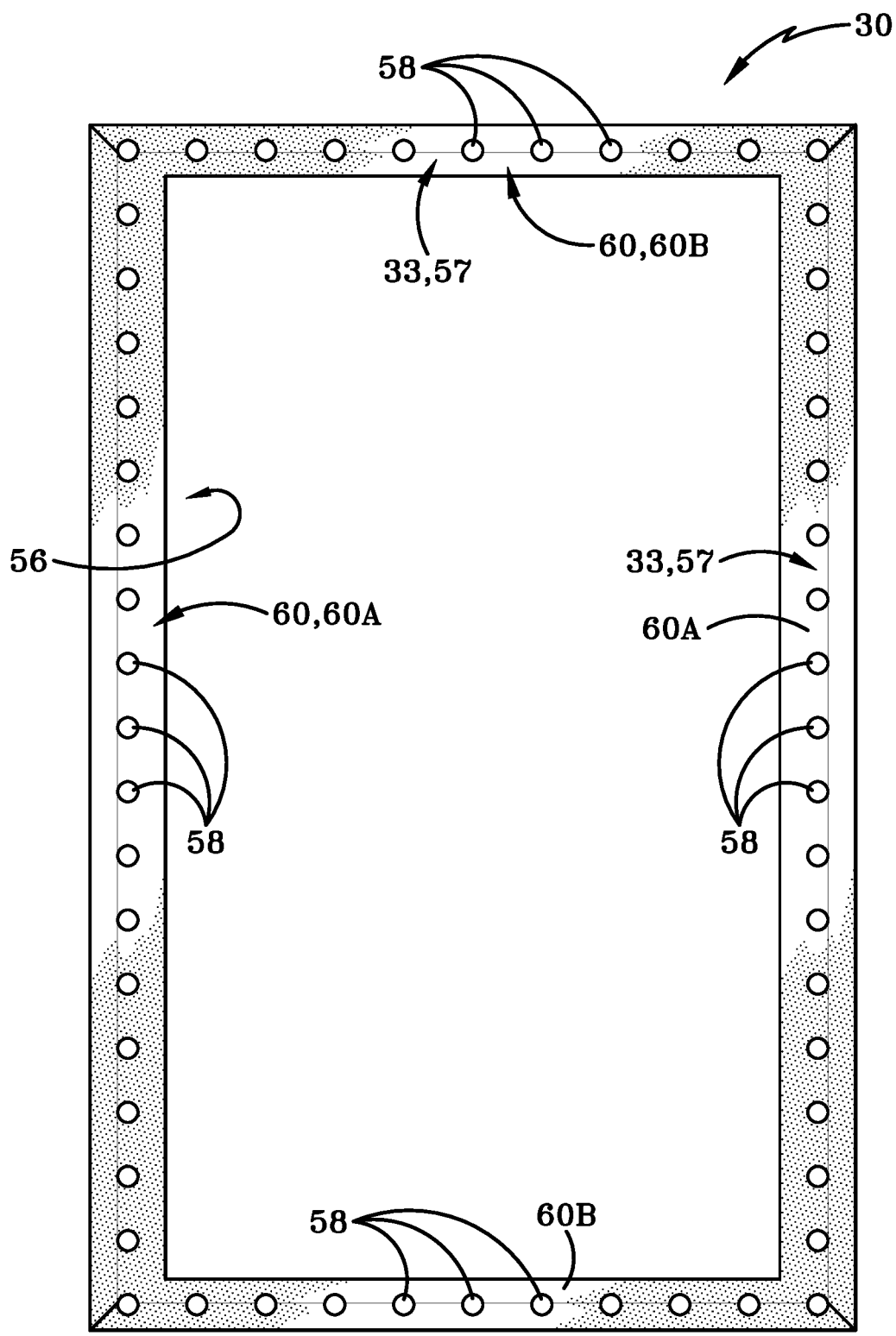
FIG. 6 is a front view of the gasket.
Figure 7:
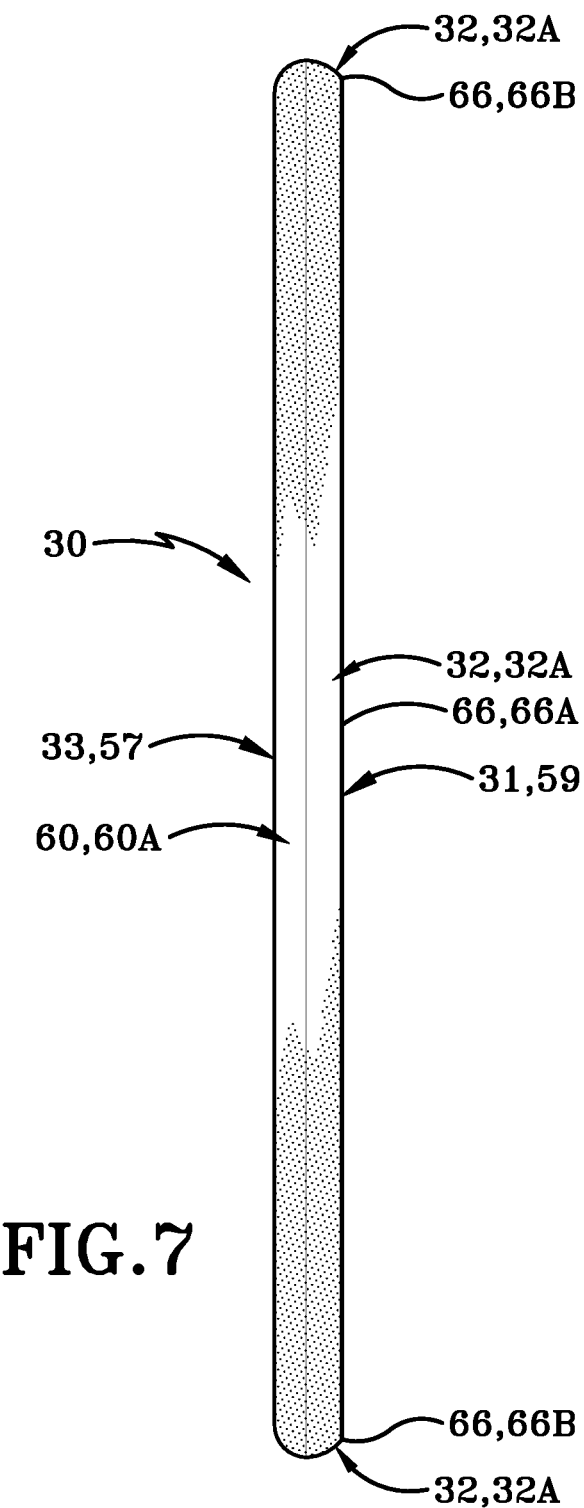
FIG. 7 is a side view of the gasket.
Figure 8:
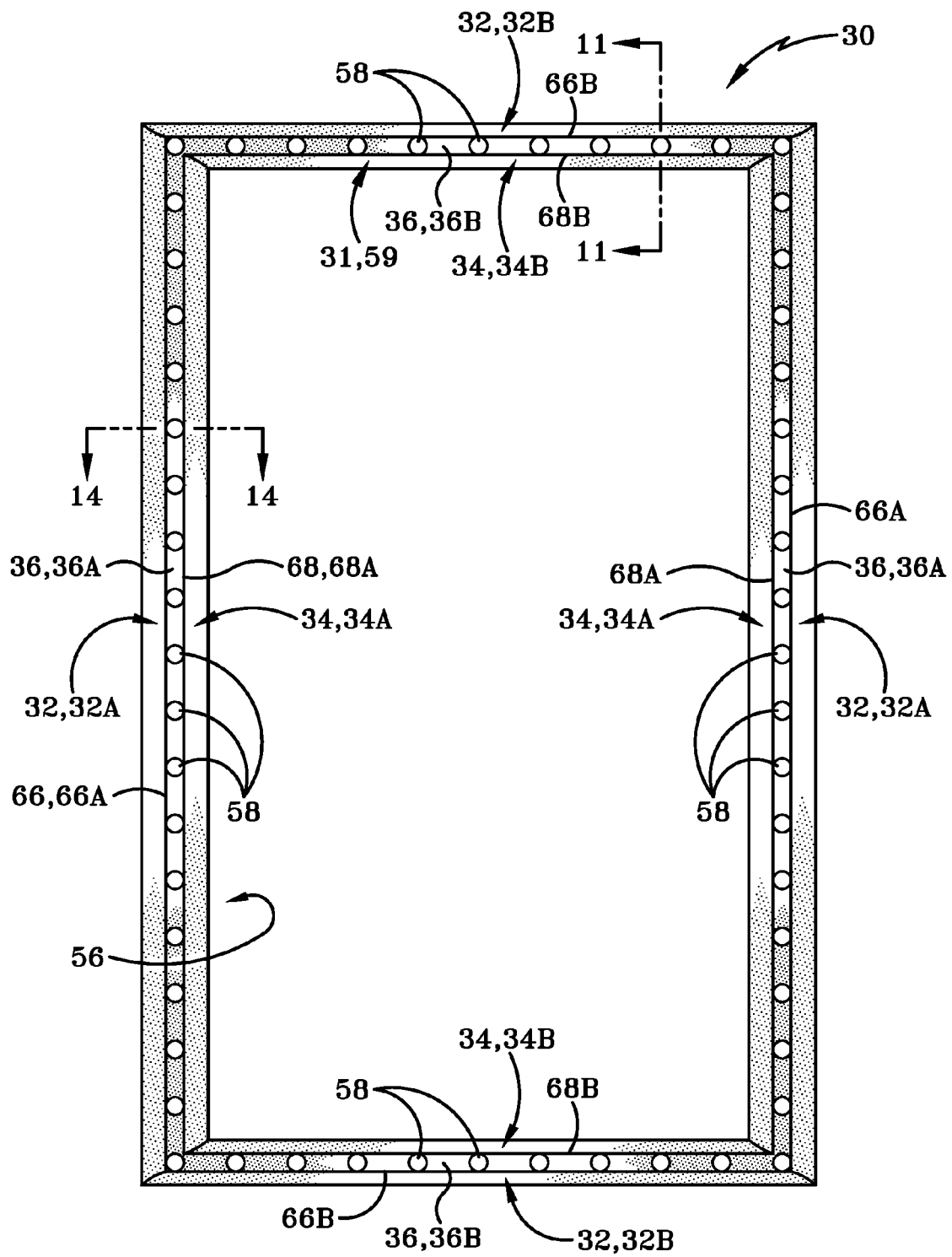
FIG. 8 is a rear view of the gasket.
Figure 9:
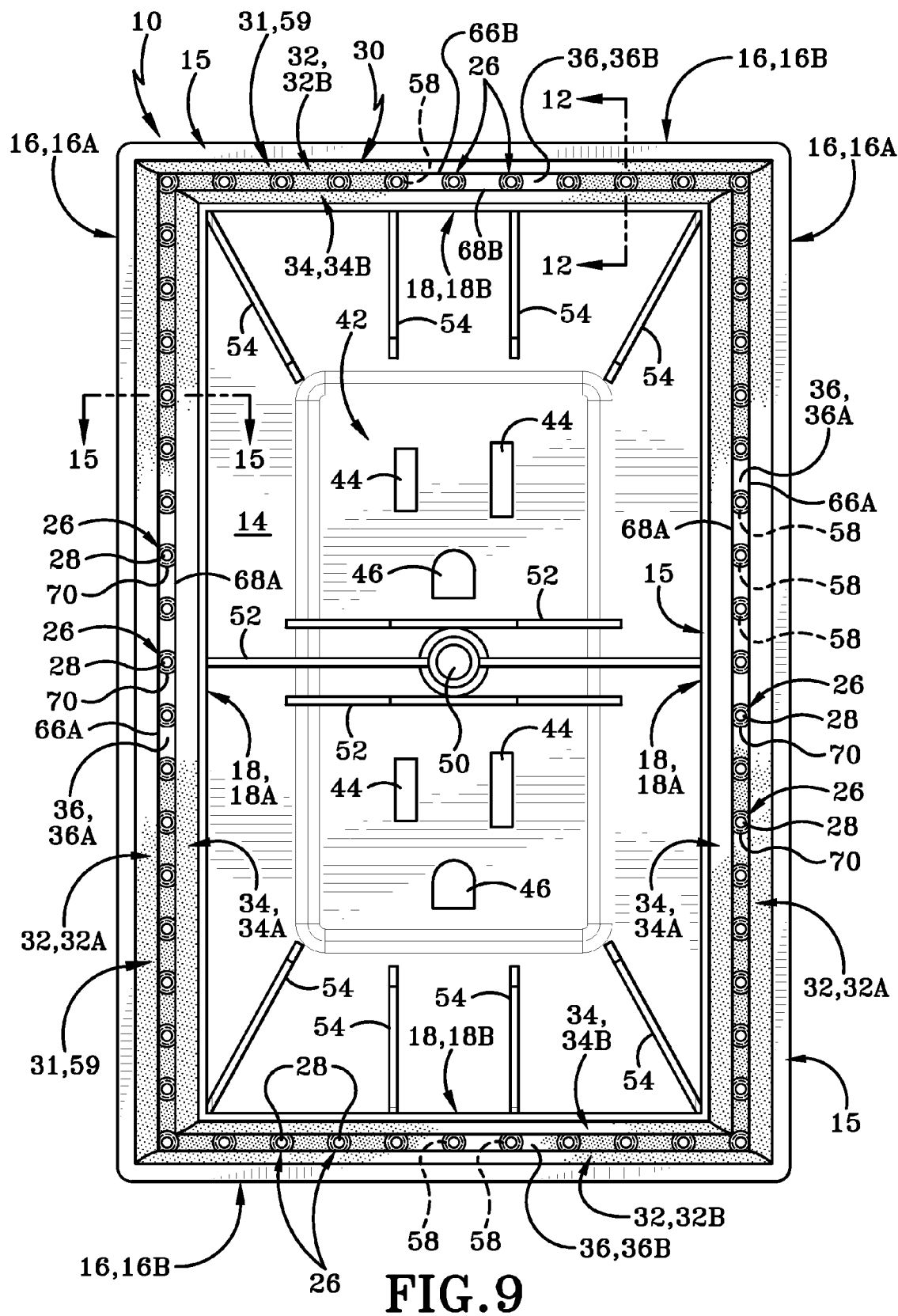
FIG. 9 is a rear view of the sealed wall plate with gasket.

This disclosure, its aspects and implementations, are not limited to the specific components or assembly procedures disclosed herein. Many additional components and assembly procedures known in the art consistent with the intended operation and assembly procedures for a sealed wall plate will become apparent for use with implementations of a sealed wall plate from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of a sealed wall plate.

FIGS. 1 through 17 illustrate a first aspect wall plate 10, while FIGS. 18-21 illustrate a second aspect wall plate 85. Wall plate 10 includes a panel 12 having a front surface 13 and a rear surface 14 with rear surface 14 having rear wall 15 contacting a wall or mounting surface 11. An outer perimeter wall 16A/B and an inner perimeter wall 18A/B together define a channel 20A/B on the left and right sides of the wall plate. Channel 20A/B is preferably generally U-shaped, but may also be square or other suitable orientations. An outer perimeter wall 22 and an inner perimeter wall 24 together define a channel 20A/B on the top and bottom sides of the wall plate. A plurality of protrusions 26 each include an aperture 28 therein. The rear surface 14 also includes a plurality of ribs 52 around a mounting aperture 50 and a plurality of ribs 54 for structural integrity.

A gasket 30 which may be permanently secured or removably secured to the rear surface 14 of the wall plate. Gasket 30 includes a rear sealing portion side 31 and a front mounting portion side 33. Rear side 31 includes an outer perimeter flange 32 and an inner perimeter flange 34 which together define a rear channel 36 on the left and right rear sides of the gasket 30 defined by the inner and outer perimeter flanges. Outer perimeter flange 32 may include rear side outer flanges 32A and top/bottom outer flanges 32B. Inner perimeter flange 34 may include rear side inner flanges 34A and rear top/bottom inner flanges 34B. An outer perimeter flange 38 and an inner flange 40 together define channel 36 on the top and bottom of the gasket. Specifically, channel 36 may include rear side channels 36A and rear top/bottom channels 36B. Flanges 32 and 34 are preferably flexible and can be elastically deformed to seal a surface between the wall plate 10 and the wall 11.

The wall plate 10 also includes front surface 12 with device cover portion 42 of panel 12 having blade apertures 44 and ground apertures 46 therein for receiving an electrical plug, while a mounting screw 48 is used to secure the wall plate 10 to the wall 11 and electrical device.

Moving to FIGS. 6-17, a front surface 57 of gasket 30 includes a plurality of mounting apertures 58 therein. Gasket 30 includes a front perimeter wall 60 which may have front side perimeter mounting walls 60A and front top/bottom perimeter mounting walls 60B which together define a space 56. A rear surface 59 shows the flexible flanges thereon which can move into place to seal the wall plate and the rear wall 15. It can also be seen that the gasket and associated components of wall plate 10 are wider on the left and right than on the top and the bottom. This is true due to the rectangular shape of the wall plate 10 and it is longer on the left and right sides which sometimes call for greater strength compared to the top and bottom sections of the wall plate.

FIGS. 10-12 illustrate various views of a top section of wall plate 10 and gasket 30. In particular, wall plate 10 includes a flanged protrusion 70 of protrusion 26 which is deformed to secure and restrict removal of gasket 30. Gasket 30 includes apertures 58 surrounded by outer flange tip 66 having an outer side perimeter flange tip 66A and an outer top/bottom perimeter flange tip 66B and inner flange tip 68 having an inner side perimeter flange tip 68A and a top/bottom perimeter flange tip 68B. Both flange tips 66 and 68 are preferable flexible, either inwards or outwards and extend beyond rear wall 15 and deform upon installation of wall plate 11 which seals the wall plate 10 with the wall 10. In one implementation, the flange tips 66 and 68 flex inwards towards each other and may or may not touch each other upon contacting the wall 11. In this orientation the flange tips 66 and 68 deflect to seal the wall plate 10 to the wall 11.

Figure 14:
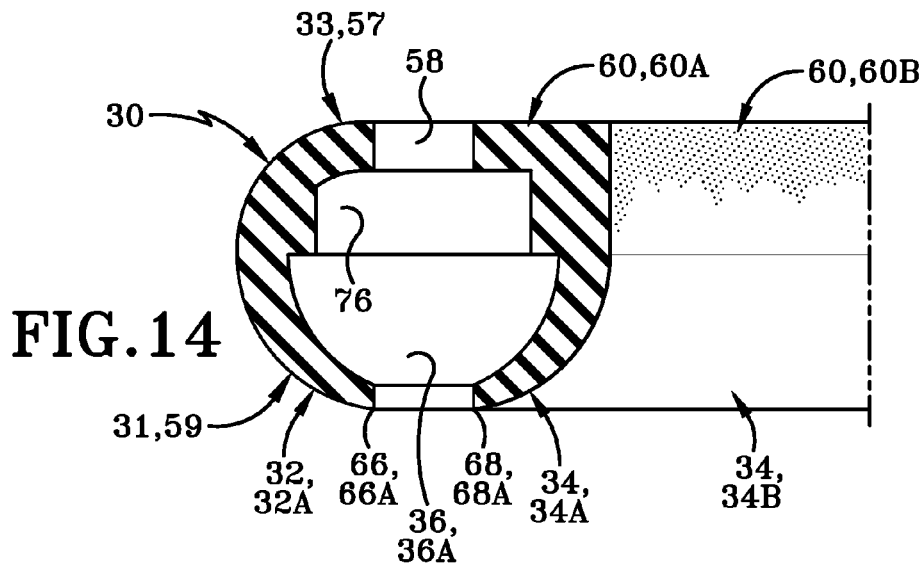
FIG. 14 is a sectional view taken generally about line 14-14 in FIG. 8.
Figure 15:
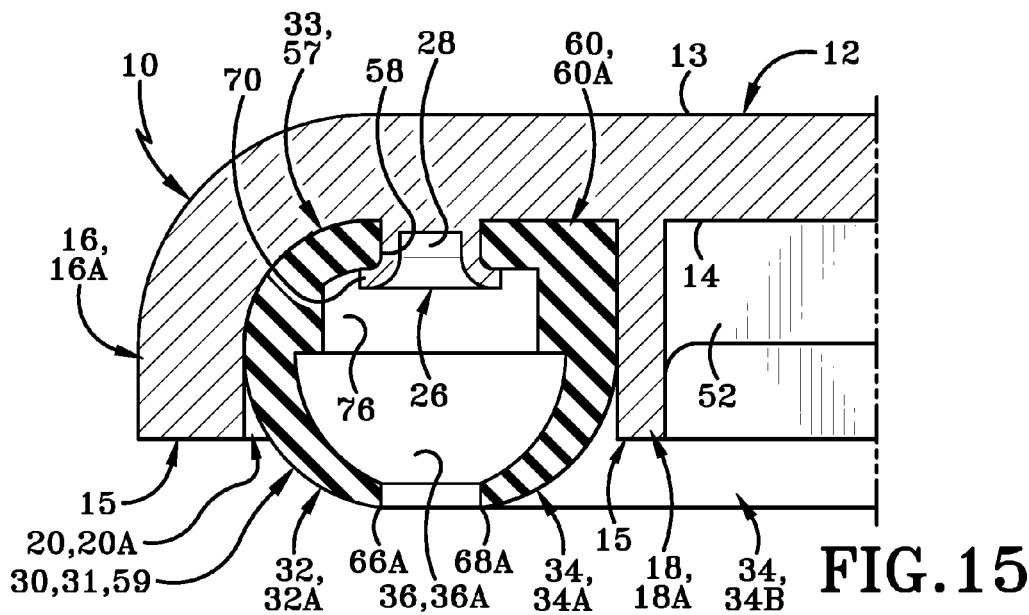
FIG. 15 is a sectional view taken generally about line 15-15 in FIG. 9.
Figure 16:
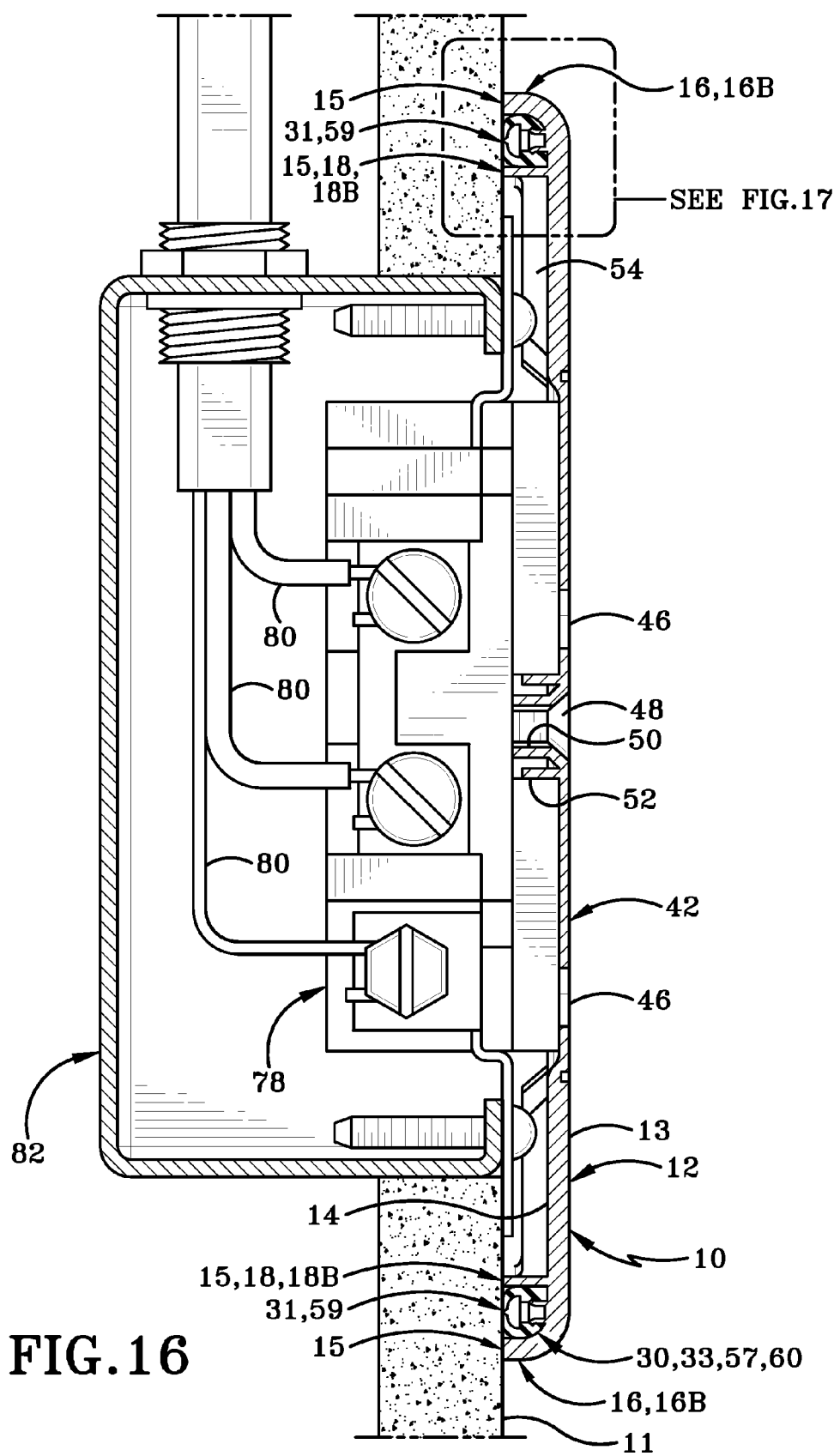
FIG. 16 is a sectional view taken generally about line 16-16 in FIG. 1.
Figure 17:
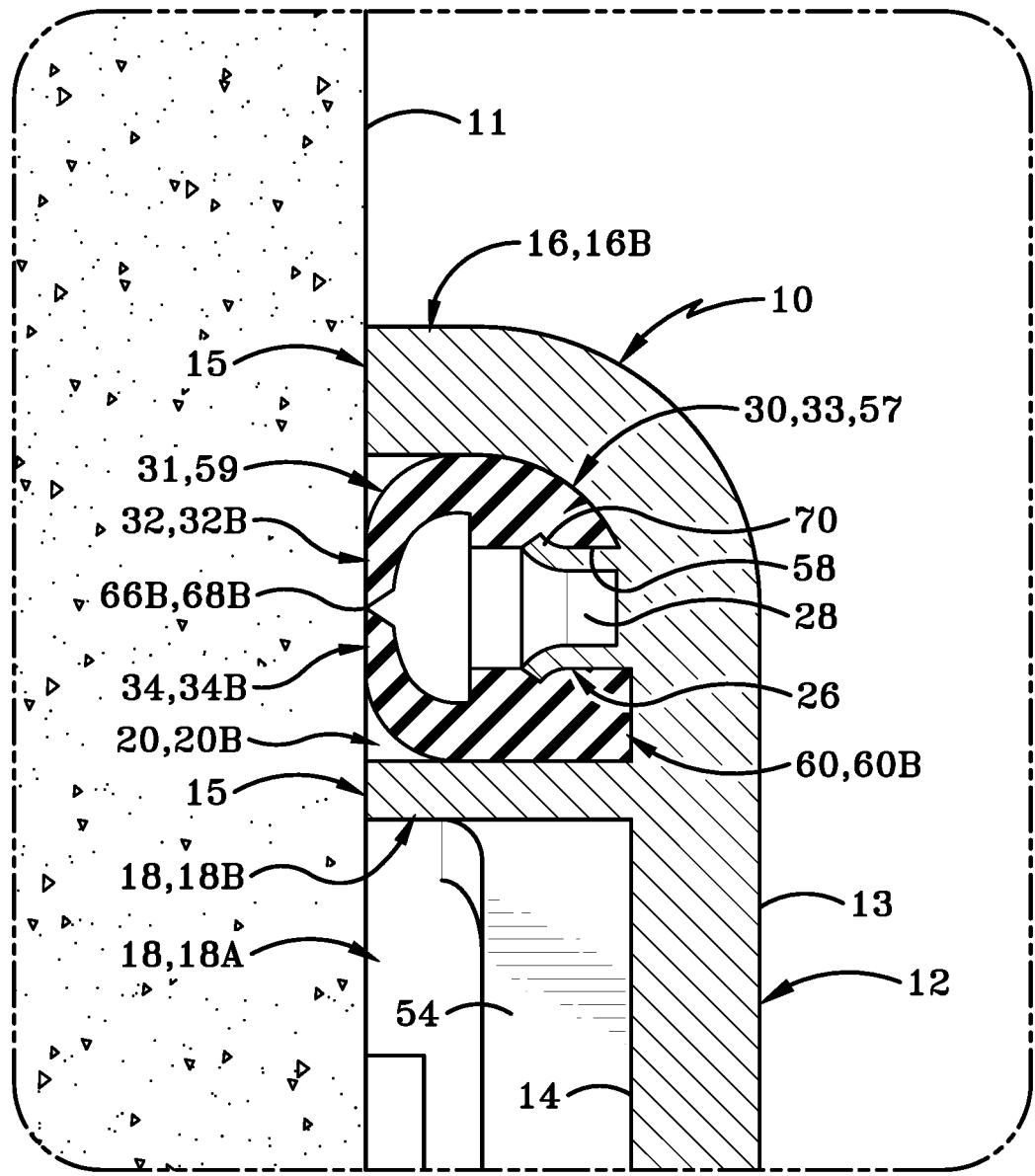
FIG. 17 is an enlarged view of the section labeled FIG. 17 in FIG. 16.
Figure 18:
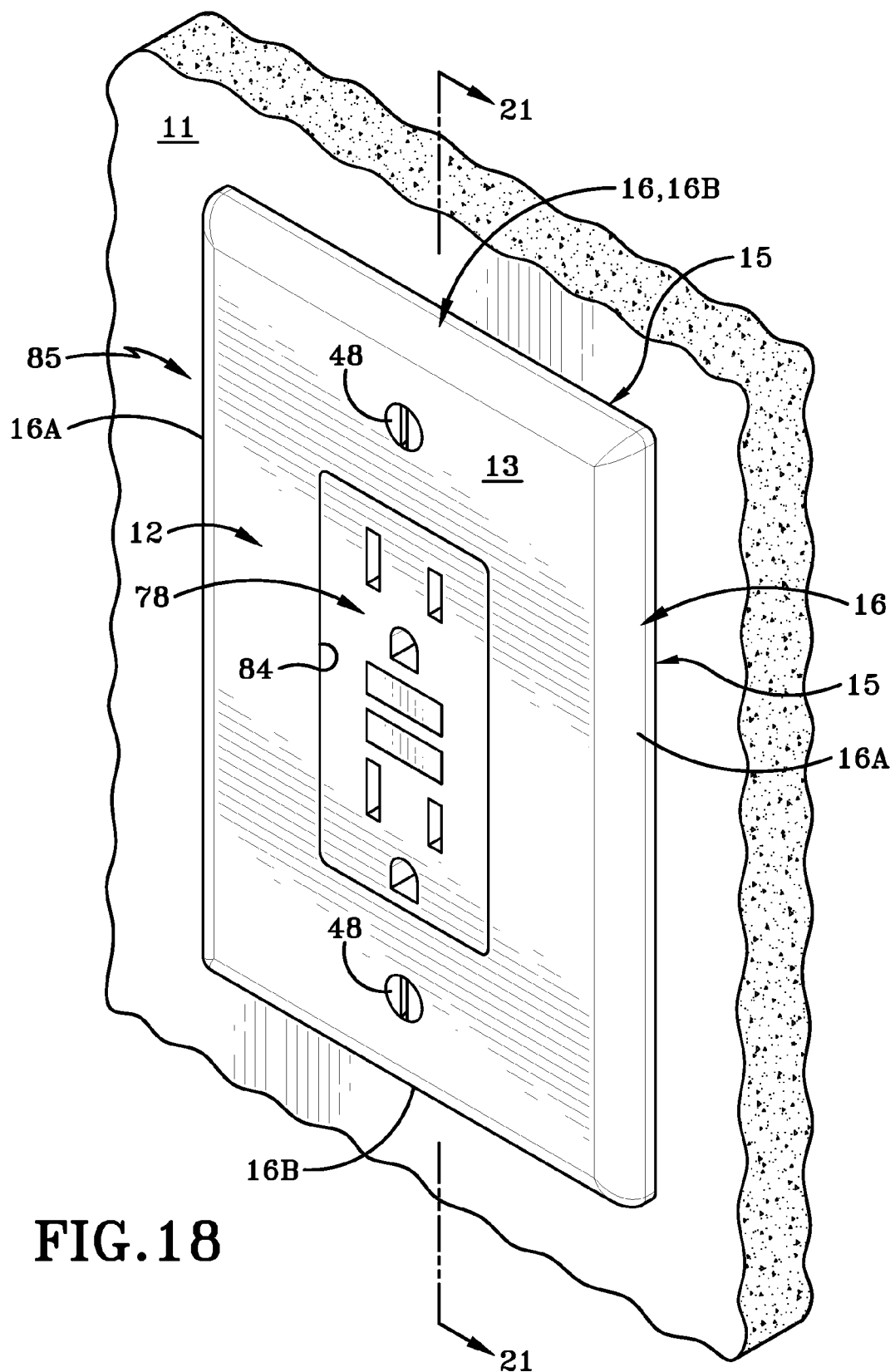
FIG. 18 is a front perspective view of a second aspect sealed wall plate.
Figure 19:
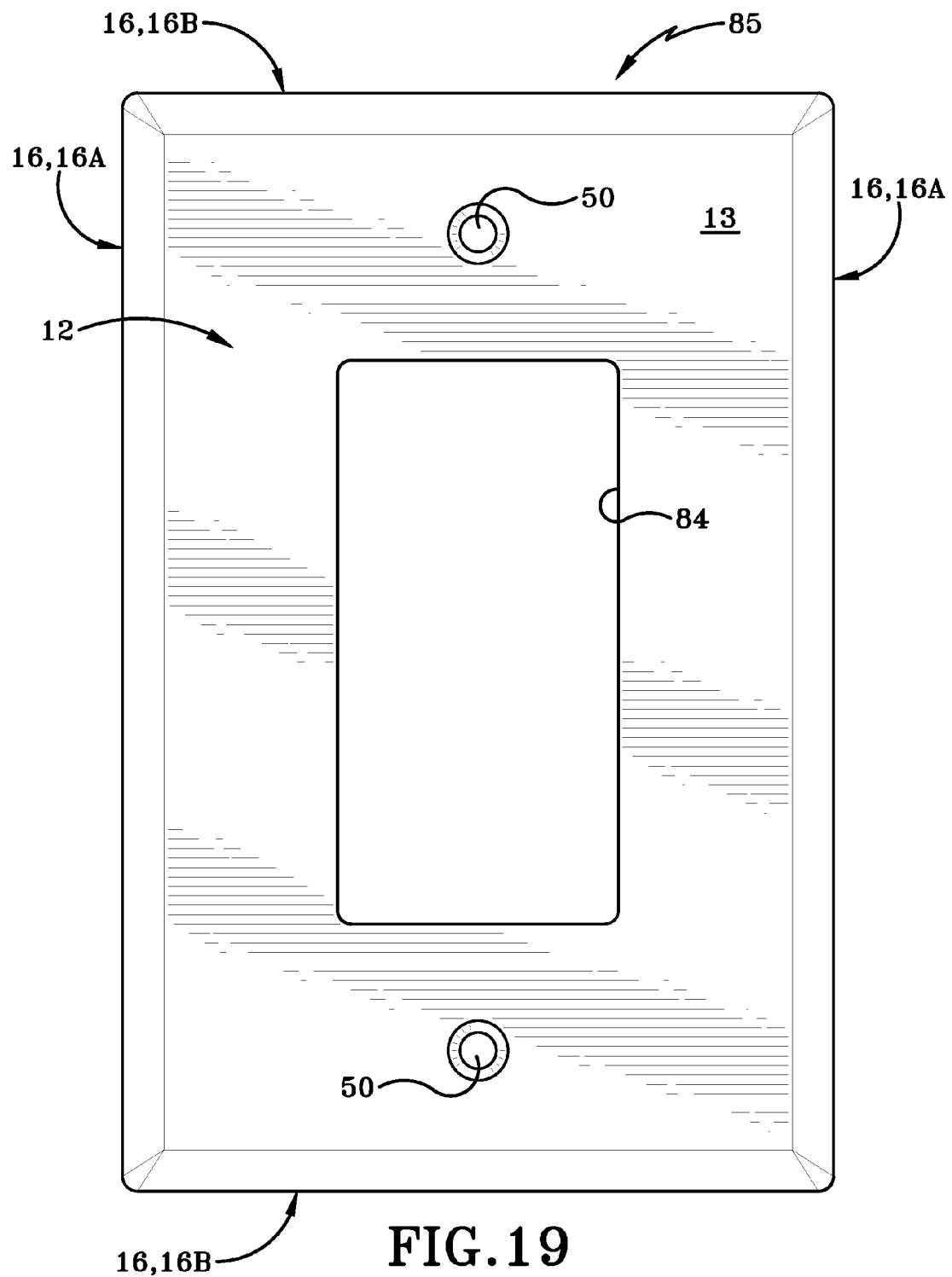
FIG. 19 is a front view of the second aspect sealed wall plate.
Figure 20:
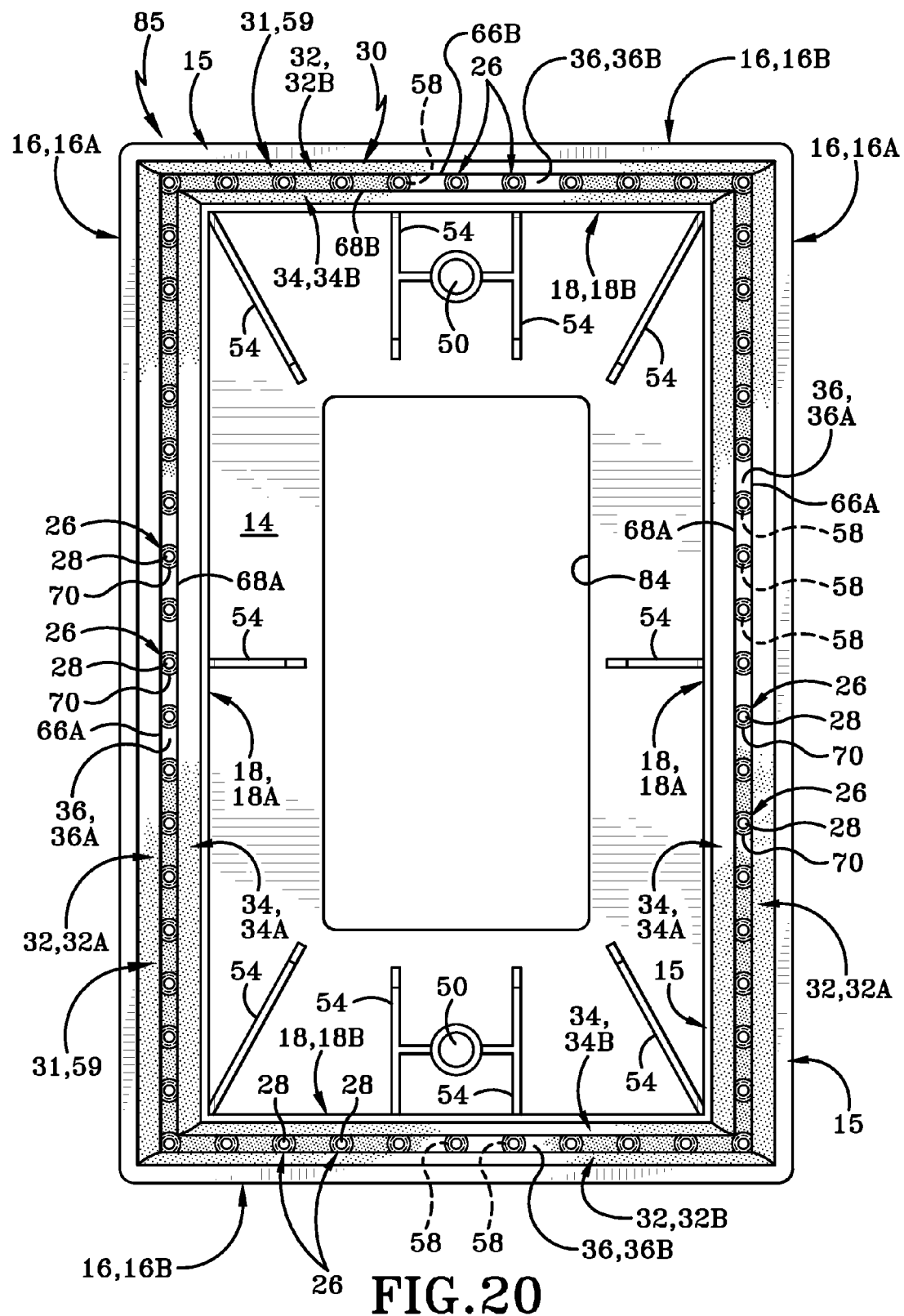
FIG. 20 is a rear view of the second aspect sealed wall plate.
Figure 21:
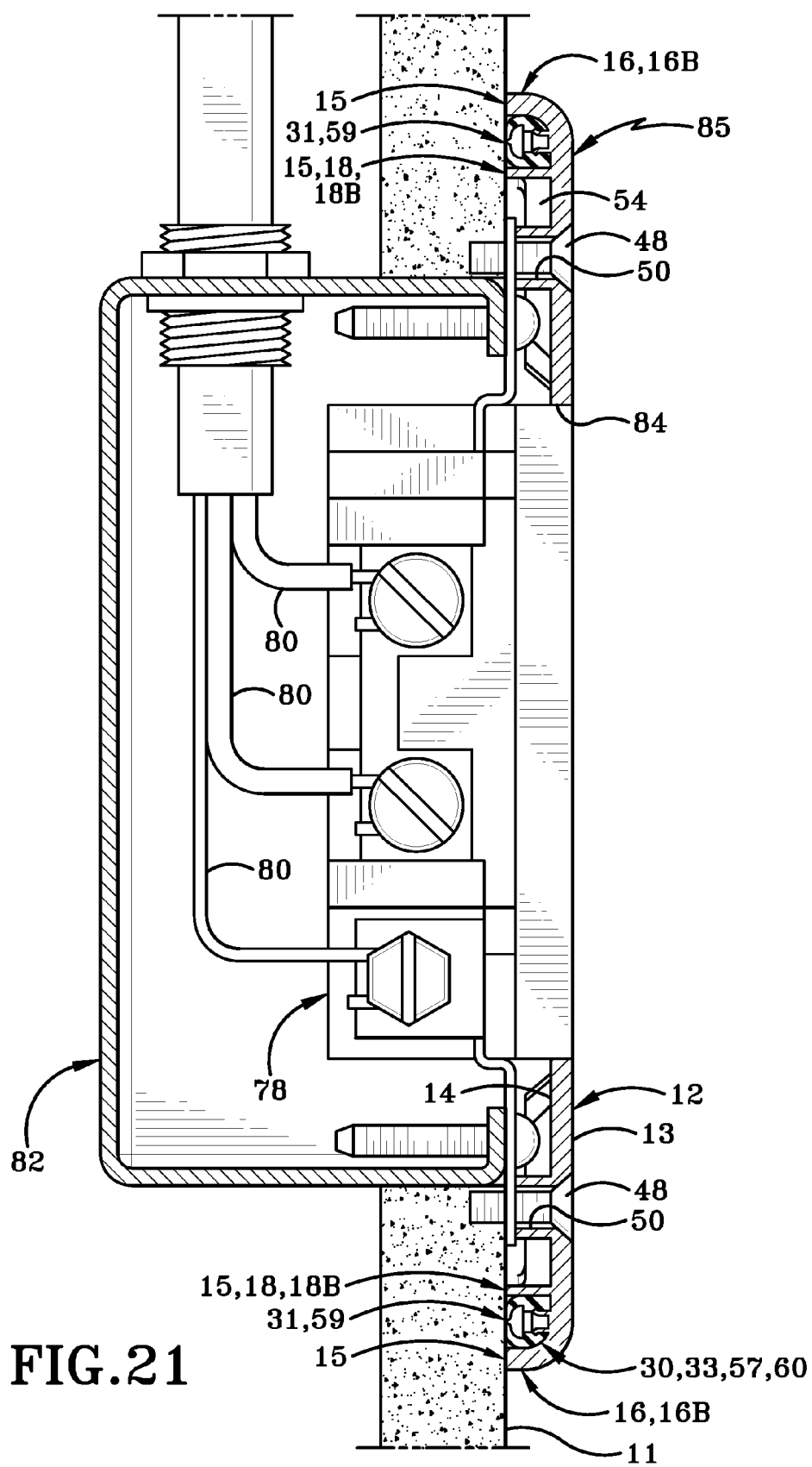
FIG. 21 is a sectional view taken generally about line 21-21 in FIG. 18.

FIGS. 13-17 illustrate gasket 30 having the aperture 58, channel 36, and a secondary aperture 76 perimeter mounting walls 60A and 60B. Secondary aperture 76 receives flanged protrusions 70 which are used to help secure gasket 30 in place. FIG. 16 illustrates an electrical device 78 with electrical wires 80 which are both within an electrical box 82. As can be seen, the wall plate 10 with gasket 30 contacts wall 11 surrounding the electrical box 82 and thereby seals the wall plate 10 and wall 11 so that air does not escape. FIG. 17 illustrates an exemplary embodiment where flange tips 66 and 68 are each deformed or deflected towards each other when rear wall 15 is contacting wall 11, thereby preventing airflow from passing around the wall plate 11 and into or out of the conditioned room space of the home. A person of skill in the art will immediately appreciate, based on Applicants disclosure that the flanges may be oriented in any such suitable manner without significant modification, which is within the spirit and scope of the present disclosure.

Figure 13:
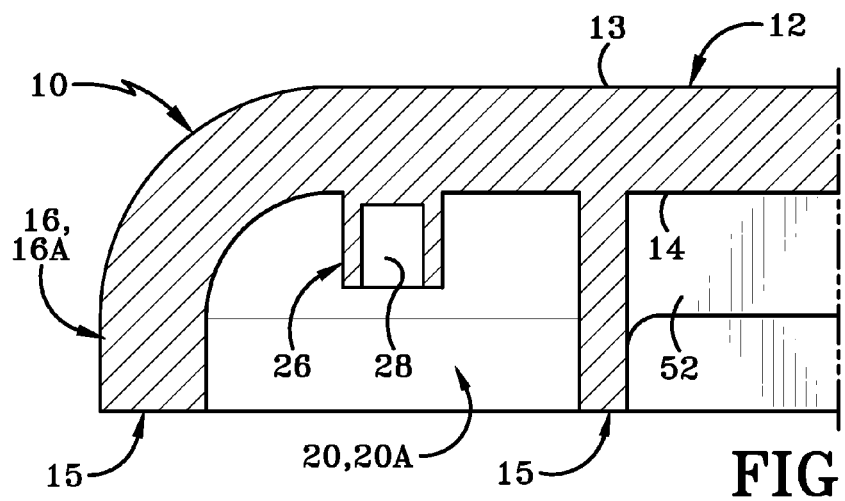
FIG. 13 is a sectional view taken generally about line 13-13 in FIG. 5.

FIGS. 13-15 also disclose outer flange tip 72 and inner flange tip 74, both of which function similar to flange tips 66 and 68, whereby flange tips 72 and 74 deform upon contact with wall 11 and provide a sealing action to prevent air flow. Gasket 30 and the various flange tips are preferably formed from a rubber or other pliable material, which may be the same for the entire gasket 30 or may be co-extruded or formed such that different materials are used for different portions of gasket 30 including a different material for flange tips 66, 68, 72, and 74. For example, the flanges may be formed of a softer material than the rest of gasket 30 such that the flanges more easily deflect. In one instance, the inner and outer flange tips may be straight along an inner and/or lower portion, while the outer or upper portion may be curved either inwards or outwards to deflect upon contact with wall 11.

FIGS. 18-21 illustrate a second aspect wall plate 85 similar to wall plate 10, except wall plate 85 includes a central aperture 84 for receiving an electrical device 78 there through. Specifically, electrical device 78 is directly accessible through central aperture 84 instead of cover the face of electrical device 78. In this aspect, two mounting apertures 50 are utilized to secure wall plate 85 to the electrical device and contact wall 11 to seal the wall plate 10.

Figure 23:
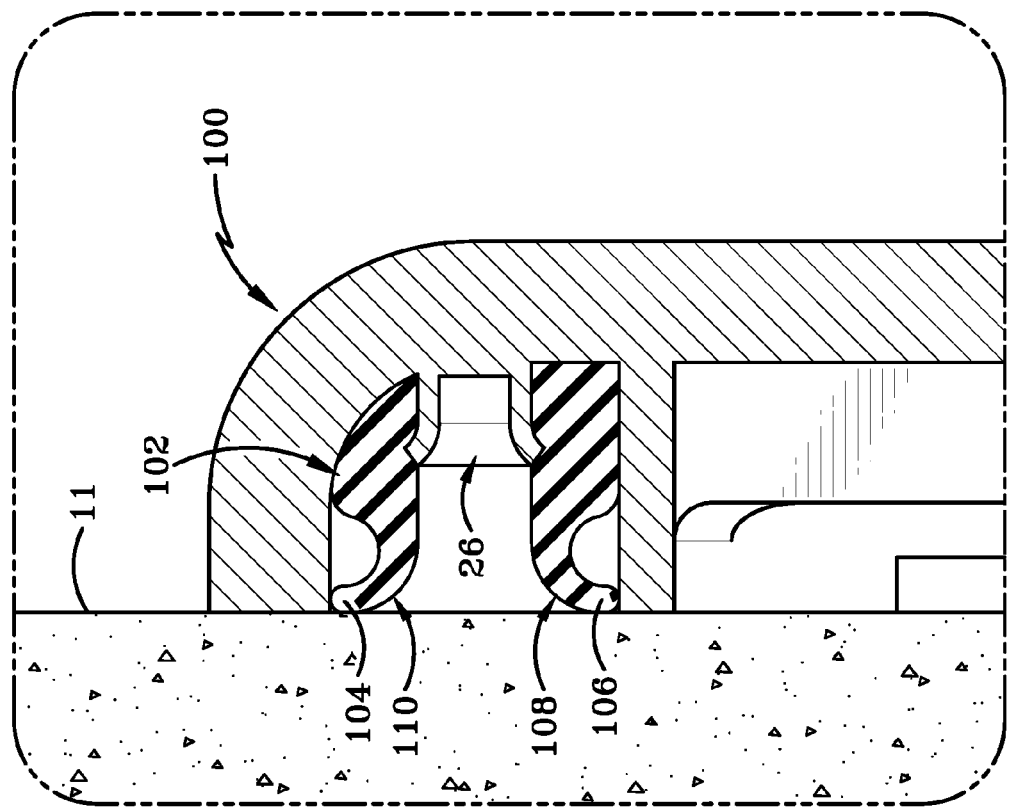
FIG. 23 is an enlarged sectional view of the third aspect sealed wall plate in a sealed position.
Figure 22:
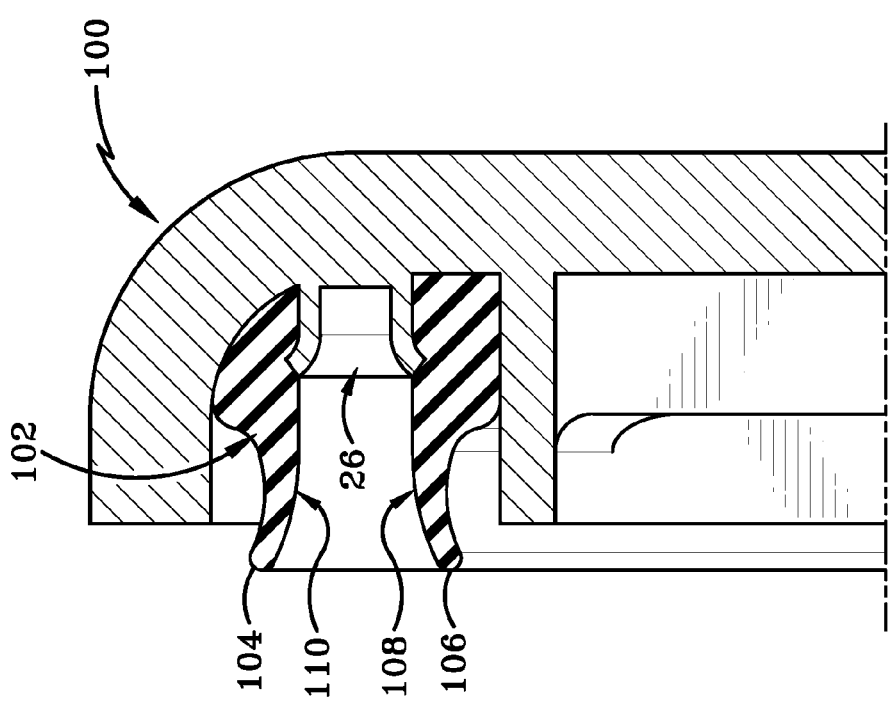
FIG. 22 is an enlarged sectional view of a third aspect sealed wall plate in an unsealed position.

FIGS. 22-23 illustrate a third implementation wall plate 100 having a gasket 102 with terminal ends 104 and 106. The terminal ends extend rearward in a generally straight orientation when relaxed and not contacting a wall sealing surface. When terminal ends 104 and 106 contact a wall surface, the terminal ends flex outwards and away from each other to seal the wall plate to the wall. In this manner, the gasket can provide an outward sealing action which may be advantageous in some circumstances. The gasket 102 may also include flex regions 108 and 110 which provide the ability of the terminal ends to flex outwardly. As can be envisioned, the function of gasket 102 is similar to gasket 30 except for the direction of flexing. In this instance, the gasket terminal ends may be fully retained within the wall plate channels or may extend outwards and be positioned between the wall plate and the wall mounting surface without departing from the spirit and scope of the present disclosure.

Figure 24:
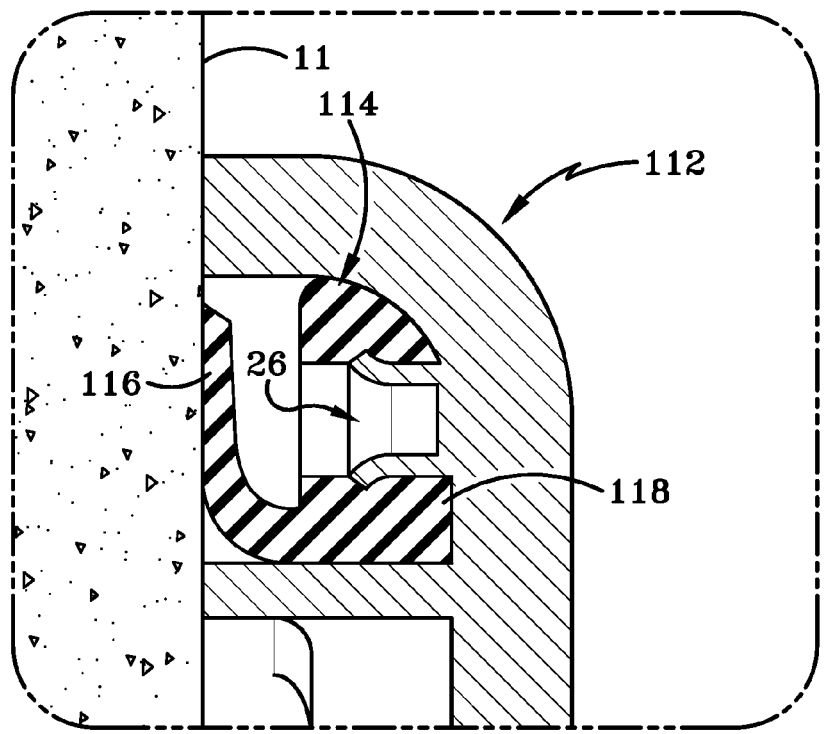
FIG. 24 is an enlarged sectional view of a fourth aspect sealed wall plate.
Figure 25:
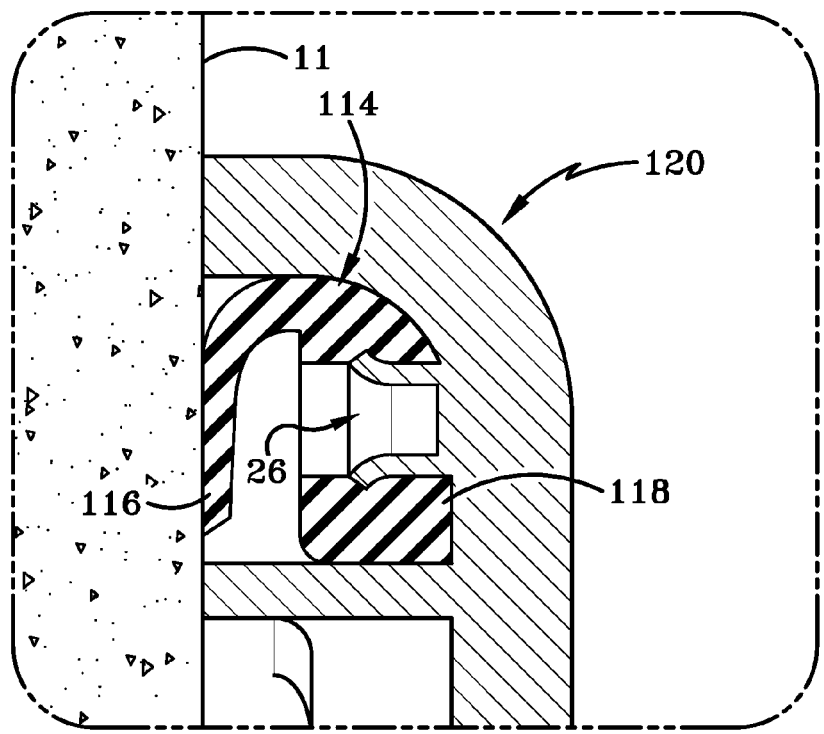
FIG. 25 is an enlarged sectional view of a fifth aspect sealed wall plate.

FIG. 24 shows a fourth implementation wall plate 112 including a gasket 114 having only a single terminal end 116 but terminal end 116 is generally longer than previously discussed embodiments. The longer terminal end allows gasket 114 to still extend beyond the rear of the wall plate and contact a wall to seal the wall plate. Gasket 114 also includes a base 118 which connects the gasket to the wall plate. The gasket 114 is positioned with terminal end 116 extending from an inner side of base 118 and folding generally outwards when contacting the mounting wall. FIG. 25 includes the same structural elements as shown in FIG. 24, except terminal end 116 extends rearward from an outer side of base 118. In this structure, the terminal end 116 folds generally inwards upon contact with the wall or mounting surface. In both implementations, the terminal end of the gasket functions to provide sealing between the wall plate and the mounting surface to reduce or eliminate air flow there through.

While only a fully covered and a decorator style electrical device wall plates are shown, a person of skill in the art will immediately appreciate that any wall plate may utilize the deformable flanges to seal the area around the wall plate without departing from the spirit and scope of the present disclosure. As such, any number of suitable wall plates may incorporate inward or outward extending flanges which contact a wall 11 and seal the area around the wall plate.

Still further, a similar gasket can be incorporated in a decorator style wall plate, a toggle switch wall plate, a duplex receptacle wall plate, or any other wall plate that is attached to a line voltage device, a control switch, a low voltage cable or device, or blank wall plates. Nevertheless, it should be apparent to a person of skill in the art that any suitable wall plate may incorporate a gasket he scope of the present disclosure. The wall plate gasket may be composed of foam, rubber, plastic, silicone, or any other flexible or compressible material. Further, the wall plate may be composed of any plastic, metal, or other suitable materials.

It will be understood that implementations are not limited to the specific components disclosed herein, as virtually any components consistent with the intended operation of a method and/or system implementation for a sealed wall plate may be utilized. Components may comprise any shape, size, style, type, model, version, class, grade, measurement, concentration, material, weight, quantity, and/or the like consistent with the intended operation of a method and/or system implementation for a sealed wall plate.

The concepts disclosed herein are not limited to the specific implementations shown herein. For example, it is specifically contemplated that the components included in a particular implementation of a sealed wall plate may be formed of any of many different types of materials or combinations that can readily be formed into shaped objects and that are consistent with the intended operation of a sealed wall plate. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the sealed wall plate may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of a sealed wall plate, it should be readily apparent that a number of modifications may be made without departing from the spirit thereof and that these implementations may be applied to other sealed wall plate. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

We claim:

1. A wall plate comprising: a plate having a front surface and a rear surface; a rear sealing portion of a gasket extending away from the rear surface; the gasket having a rear surface positioned adjacent the sealing portion; and, wherein the gasket rear surface is flexible and folds upon contact with an outer perimeter flange and a mounting surface or wall of a perimeter of the rear surface of the wall plate rear surface.

2. The wall plate of claim 1 wherein the gasket rear surface is generally U-shaped.

3. The wall plate of claim 1 wherein the gasket rear surface includes two prongs which contact each other when the gasket rear surface contacts the mounting surface.

4. The wall plate of claim 1 wherein the wall plate further comprises at least one mounting aperture extending from the front surface to the rear surface.

5. The wall plate of claim 1 wherein the plate rear surface further comprises a channel at least partially defined by the rear perimeter wall.

6. The wall plate of claim 1 wherein the gasket is positioned within the channel and extends rearward out of the channel.

7. The wall plate of claim 1 wherein the wall plate rear surface further comprises a plurality of mounting protrusion extending away from the rear surface.

8. The wall plate of claim 7 wherein the gasket further comprises a plurality of mounting apertures arranged to receive the plurality of mounting protrusions.

9. The wall plate of claim 1 wherein the gasket is comprised of rubber.

10. The wall plate of claim 1 wherein the gasket is thicker on two sides.

11. The wall plate of claim 1 wherein the gasket is thicker along two long sides of the wall plate.

12. The wall plate of claim 1 wherein gasket further comprises an inner straight wall oriented opposite a curved outer wall.

* * * * *